United States Patent
Davis et al.

(10) Patent No.: US 9,587,502 B2
(45) Date of Patent: Mar. 7, 2017

(54) SLIDING COMPLIANT SEAL

(71) Applicant: UNITED TECHNOLOGIES CORPORATION, Farmington, CT (US)

(72) Inventors: Timothy M. Davis, Kennebunk, ME (US); Mark J. Rogers, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/640,641

(22) Filed: Mar. 6, 2015

(65) Prior Publication Data

US 2016/0258308 A1 Sep. 8, 2016

(51) Int. Cl.
- *F02F 11/00* (2006.01)
- *F01D 11/00* (2006.01)
- *F16J 15/10* (2006.01)

(52) U.S. Cl.
CPC ........... *F01D 11/005* (2013.01); *F16J 15/104* (2013.01); *F05D 2220/32* (2013.01); *F05D 2240/55* (2013.01)

(58) Field of Classification Search
CPC ............. F16J 2015/0837; F02F 11/002; F05D 2250/75; F05D 2240/11; F01D 11/005; F01D 11/003
See application file for complete search history.

(56) References Cited

U.S. PATENT DOCUMENTS

| | | | | |
|---|---|---|---|---|
| 2,631,908 A | * | 3/1953 | Teetor | F16J 9/203 277/462 |
| 2,701,155 A | * | 2/1955 | Estel, Jr. | F16J 15/3236 267/163 |
| 3,857,572 A | * | 12/1974 | Taylor | F16J 15/0887 277/609 |
| 4,121,843 A | * | 10/1978 | Halling | F01D 11/005 277/647 |
| 4,199,151 A | * | 4/1980 | Bartos | F01D 11/005 277/306 |
| 4,602,795 A | * | 7/1986 | Lillibridge | F16J 15/0887 277/644 |
| 4,603,892 A | * | 8/1986 | Abbes | F16J 15/0893 277/614 |
| 4,759,555 A | * | 7/1988 | Halling | F16J 9/18 277/631 |
| 4,783,085 A | | 11/1988 | Wicks et al. | |
| 4,798,392 A | * | 1/1989 | Tozer | F16J 15/0887 277/644 |
| 4,854,600 A | * | 8/1989 | Halling | F16J 15/021 277/626 |
| 4,902,198 A | * | 2/1990 | North | F01D 9/04 415/115 |
| 5,014,917 A | * | 5/1991 | Sirocky | B64G 1/50 239/265.11 |
| 5,158,430 A | * | 10/1992 | Dixon | F01D 11/005 415/134 |

(Continued)

*Primary Examiner* — Kristina Fulton
*Assistant Examiner* — Eugene G Byrd
(74) *Attorney, Agent, or Firm* — Cantor Colburn LLP

(57) ABSTRACT

The present disclosure relates generally to a seal between two circumferential components. The seal comprises one or more rope seals retained within the seal cavity by a carrier.

18 Claims, 8 Drawing Sheets

FORWARD ⟵ ⟶ AFT

(56) References Cited

U.S. PATENT DOCUMENTS

| | | | | |
|---|---|---|---|---|
| 5,188,506 A | * | 2/1993 | Creevy | F01D 11/005 277/643 |
| 5,240,263 A | * | 8/1993 | Nicholson | F16J 15/0893 219/137 R |
| 5,249,814 A | * | 10/1993 | Halling | F16J 15/0887 228/214 |
| 6,199,871 B1 | * | 3/2001 | Lampes | F01D 11/005 277/614 |
| 6,299,178 B1 | * | 10/2001 | Halling | F16J 15/0887 277/644 |
| 6,352,267 B1 | * | 3/2002 | Rode | F16J 15/0887 277/631 |
| 6,588,761 B2 | * | 7/2003 | Halling | F16L 23/16 277/312 |
| 7,090,224 B2 | * | 8/2006 | Iguchi | F01D 11/005 277/603 |
| 7,090,459 B2 | * | 8/2006 | Bhate | F01D 11/025 277/581 |
| 7,101,147 B2 | * | 9/2006 | Balsdon | F01D 11/005 277/642 |
| 7,121,790 B2 | | 10/2006 | Fokine et al. | |
| 7,152,864 B2 | * | 12/2006 | Amos | F01D 11/005 277/650 |
| 7,316,762 B2 | * | 1/2008 | Lah | C10B 25/10 202/242 |
| 7,347,425 B2 | | 3/2008 | James | |
| 7,665,953 B2 | * | 2/2010 | Lee | F01D 9/04 415/1 |
| 8,118,549 B2 | * | 2/2012 | Schiavo | F01D 9/023 415/182.1 |
| 8,123,232 B2 | * | 2/2012 | Fujimoto | F01D 9/023 277/644 |
| 8,157,511 B2 | * | 4/2012 | Pietrobon | F01D 11/005 277/641 |
| 8,491,259 B2 | * | 7/2013 | Sutcu | F01D 9/023 415/134 |
| 8,511,972 B2 | * | 8/2013 | Sutcu | F01D 9/023 277/644 |
| 8,651,497 B2 | * | 2/2014 | Tholen | F01D 11/005 277/644 |
| 8,695,989 B2 | * | 4/2014 | Dahlke | F23M 5/02 277/644 |
| 8,888,445 B2 | * | 11/2014 | Pruthi | F01D 11/005 415/174.1 |
| 9,103,225 B2 | * | 8/2015 | Lutjen | F01D 11/08 |
| 9,140,388 B2 | * | 9/2015 | Baca | F16J 15/025 |
| 2009/0243228 A1 | * | 10/2009 | Heinemann | F01D 11/005 277/595 |
| 2012/0156029 A1 | * | 6/2012 | Karafillis | F01D 11/08 415/213.1 |
| 2012/0195743 A1 | * | 8/2012 | Walunj | F01D 11/006 415/174.5 |
| 2013/0113168 A1 | | 5/2013 | Lutjen et al. | |
| 2013/0266416 A1 | * | 10/2013 | Bergman | F01D 25/246 415/1 |
| 2014/0286751 A1 | * | 9/2014 | Brunelli | F01D 11/24 415/116 |
| 2016/0003080 A1 | * | 1/2016 | Mcgarrah | F01D 11/003 415/173.1 |

* cited by examiner

SLIDING COMPLIANT SEAL

TECHNICAL FIELD OF THE DISCLOSURE

The present disclosure is generally related to seals and, more specifically, to a compliant seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or decrease their longevity. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but less relative flexibility.

Improvements in seal design are therefore needed in the art.

SUMMARY OF THE DISCLOSURE

In one embodiment, a seal for sealing a space defined by first and second adjacent components disposed about a centerline is disclosed, the seal comprising: a first compliant seal; a second compliant seal; and a carrier comprising: a circumferential center wall; a first rim extending from the center wall in a first axial direction, the first rim at least partially supporting the first compliant seal; and a second rim extending from the center wall in a second axial direction, the second rim at least partially supporting the second compliant seal; wherein the first and second compliant seals are configured to sealingly engage with the first and second components.

In a further embodiment of the above, the first compliant seal comprises a first rope seal and second compliant seal comprises a second rope seal.

In a further embodiment of any of the above, a portion of the first compliant seal extends in the first axial direction further than the first rim and a portion of the second compliant seal extends in the second axial direction further than the second rim.

In a further embodiment of any of the above, a sheath substantially encapsulates the first compliant seal and the second compliant seal.

In a further embodiment of any of the above, the sheath is formed from a material selected from the group consisting of a wire mesh, a non-metallic material, and a ceramic textile.

In a further embodiment of any of the above, an omega seal is disposed between the first compliant seal and the second compliant seal and operative to bias the first compliant seal against the first component and the second compliant seal against the second component.

In a further embodiment of any of the above, a sheath substantially encapsulates the first compliant seal, the second compliant seal, and the omega seal.

In a further embodiment of any of the above, a wave spring is disposed between the first compliant seal and the second compliant seal and operative to bias the first compliant seal against the first component and the second compliant seal against the second component.

In a further embodiment of any of the above, a sheath substantially encapsulates the first compliant seal, the second compliant seal, and the wave spring.

In a further embodiment of any of the above, two or more radial posts extend radially from the carrier, wherein a first portion of the wave spring is disposed in the first axial direction from at least one of the radial posts, and a second portion of the wave spring is disposed in the second axial direction from at least another one of the radial posts.

In a further embodiment of any of the above, the first and second rope seals comprise braided ceramic rope seals.

In a further embodiment of any of the above, the carrier is selected from the group consisting of: continuous hoop and split.

In a further embodiment of any of the above, the center wall extends radially inward from the first rim and the second rim and contacts the second component.

In a further embodiment of any of the above, the carrier has a carrier diameter in a free state that is less than a radially inner cavity diameter of the seal cavity, wherein the carrier preloads radially inward when disposed within the seal cavity.

In a further embodiment of any of the above, the carrier further comprises: a third rim extending from the center wall in the first axial direction, wherein the first rim and the third rim define a first circumferential cavity therebetween; a fourth rim extending from the center wall in the second axial direction, wherein the second rim and the fourth rim define a second circumferential cavity therebetween; wherein the first compliant seal is at least partially disposed within the first cavity and the second compliant seal is at least partially disposed within the second cavity.

In a further embodiment of any of the above, the carrier is formed from a material selected from one of a high-temperature metal alloy, a high-temperature ceramic material, and a high-temperature ceramic composite, or a combination of two or more of a high-temperature metal alloy, a high-temperature ceramic fiber material and a high-temperature ceramic fiber composite.

In another embodiment, a seal for sealing a space defined by first and second adjacent components disposed about a centerline, the seal comprising: a compliant seal; and a carrier comprising: a circumferential center wall; a first rim extending from the center wall in a first axial direction, the first rim at least partially supporting the first compliant seal; and a second rim extending from the center wall in a second axial direction, the second rim at least partially supporting the second compliant seal; wherein the first rim and the second rim at least partially support the compliant seal; and wherein the compliant seal is configured to sealingly engage with the first and second components.

In a further embodiment of any of the above, a sheath substantially encapsulates the compliant seal and the carrier.

In a further embodiment of any of the above, the compliant seal comprises a rope seal.

In a further embodiment of any of the above, the sheath is formed from a material selected from the group consisting of a wire mesh, a non-metallic material, and a ceramic textile.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
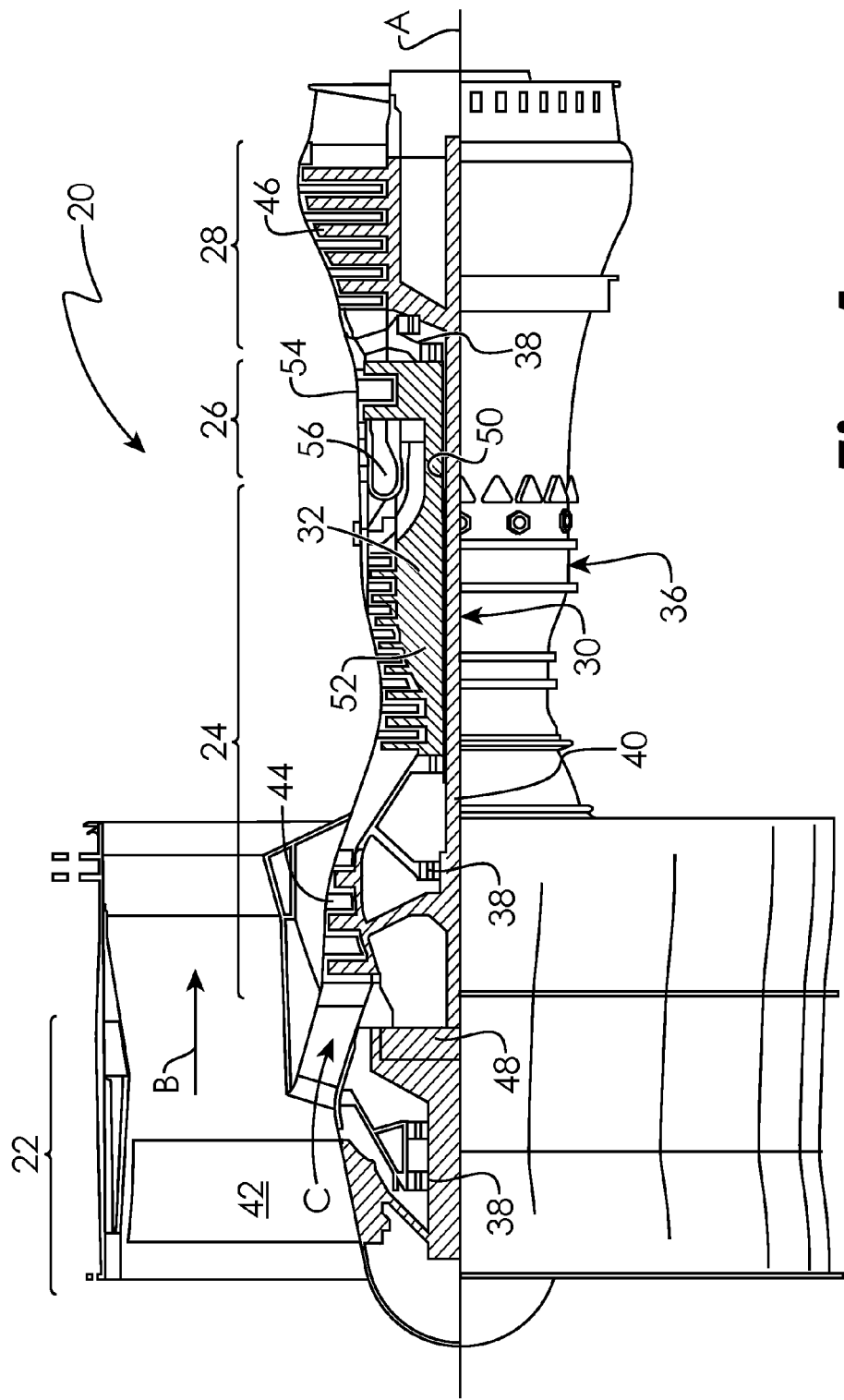
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
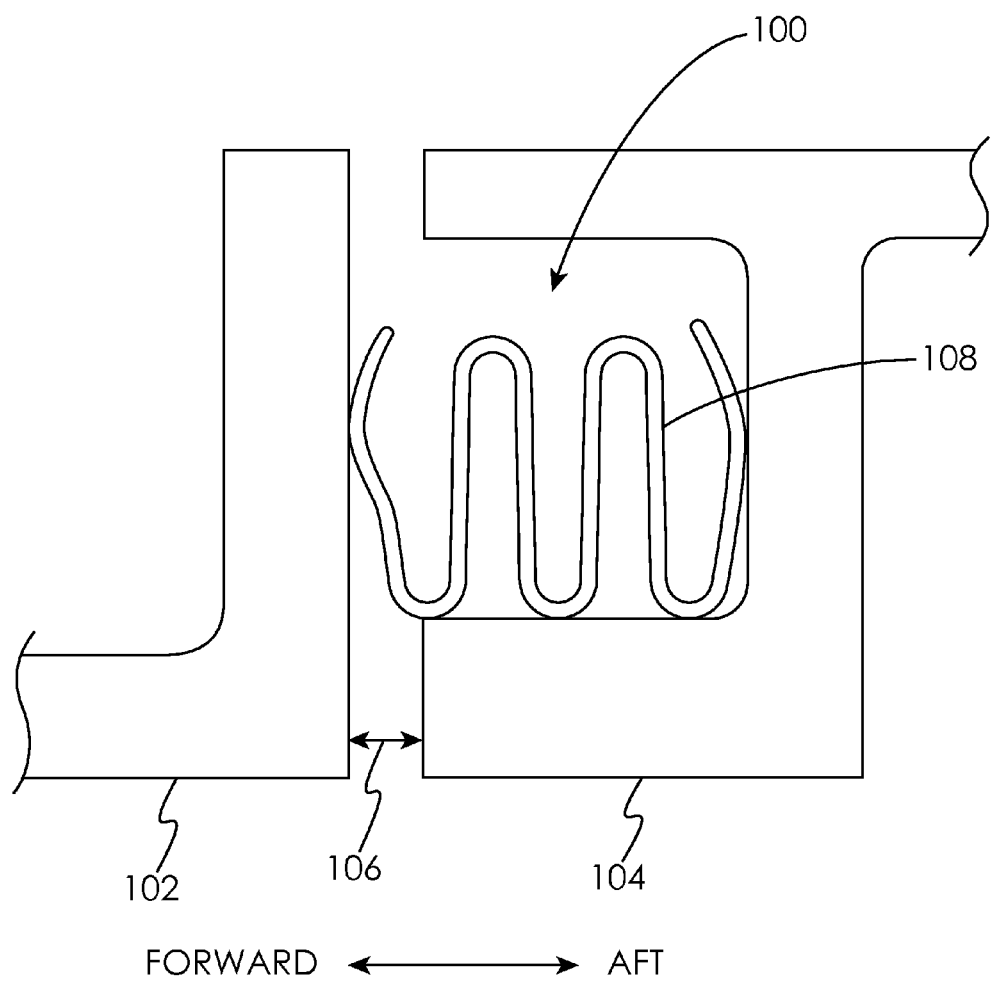
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop circumferential turbine components 102 and 104 which may move axially, radially, and/or circumferentially relative to one another about an axial centerline CL of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies an annular w-seal 108 formed from a material appropriate to the anticipated operating conditions (e.g., deflection, temperature, pressure, etc.) of the w-seal 108, such as nickel-based alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
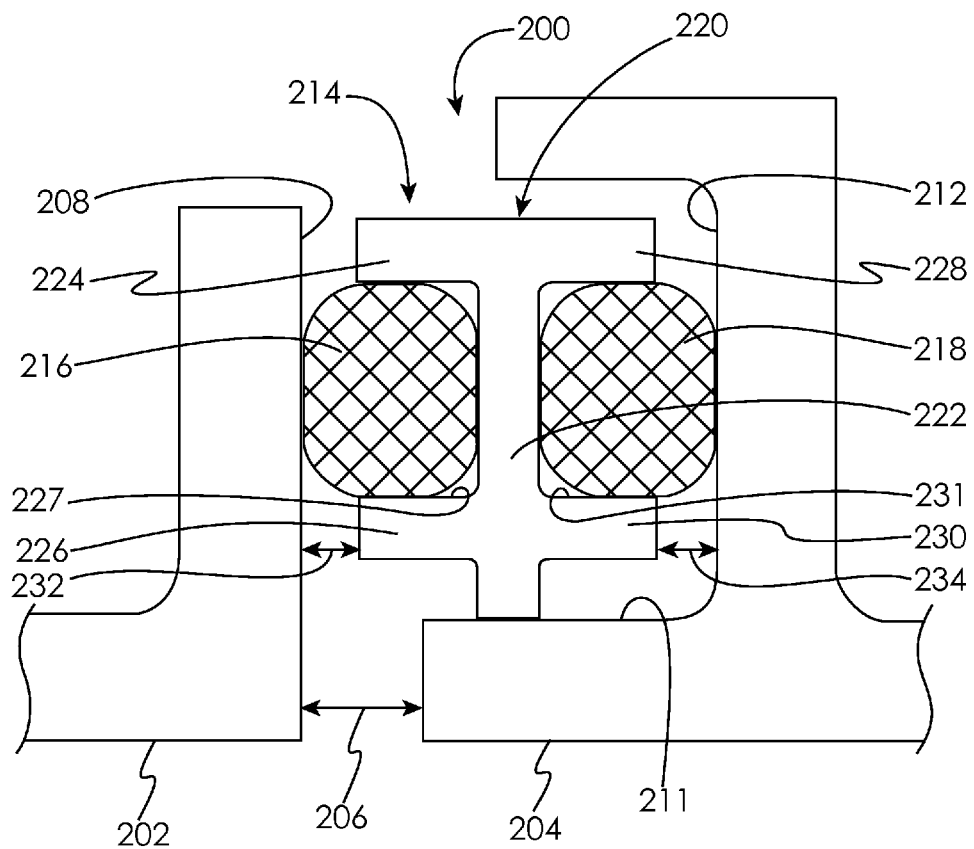
FIG. 3 is a schematic cross-sectional view of a seal and seal cavity in an embodiment.

FIG. 3 schematically illustrates a cross-sectional view of one embodiment of a seal cavity 200 formed by two axially-adjacent segmented circumferential turbine components 202 and 204 which may move axially, radially, and circumferentially relative to one another about an axial centerline of the turbine engine. A nominal design clearance 206 exists between the components 202 and 204. Component 202 includes an axially forward surface 208 facing the seal cavity 200. Similarly, component 204 includes a radially inner surface 211 and axially aft surface 212, each facing the seal cavity 200. Within the seal cavity 200 lies a seal 214 formed from materials appropriate to the anticipated operating conditions of the seal 214. The seal 214 includes a first compliant seal (e.g., a rope seal) 216 and a second compliant seal (e.g., a rope seal) 218. The first rope seal 216 and the second rope seal 218 may comprise braided ceramic rope seals, to name just one non-limiting example.

The first rope seal 216 and the second rope seal 218 are held by a carrier 220. In an embodiment, the carrier 220 comprises a circumferential center wall 222. A first rim 224 extends forward from the center wall 222 in a substantially axial direction. A second rim 226 also extends forward from the center wall 222 in a substantially axial direction, wherein the second rim 226 is disposed at a smaller radial diameter than the first rim 224. The first rim 224 and the second rim 226 define a first circumferential cavity 227 therebetween. A third rim 228 extends aft from the center wall 222 in a substantially axial direction. A fourth rim 230 also extends aft from the center wall 222 in a substantially axial direction, wherein the fourth rim 230 is disposed at a smaller radial diameter than the third rim 228. The third rim 228 and the fourth rim 230 define a second circumferential cavity 231 therebetween. The cavity 227 mechanically traps the rope seal 216 and the cavity 231 mechanically traps the rope seal 218, while exposing enough of the rope seals 216, 218 to allow them to conform to the respective surfaces 208, 212 of the components 202, 204. The carrier 220 may come into contact with surface 211 to provide additional sealing in some embodiments. As discussed further below, the seal 214 may comprise a continuous hoop or may be split at one circumferential location. If the seal 214 is split at one circumferential location, then pressure acts to load the seal 214 radially inboard and contact/seal against the surface 211 of the component 204. In an embodiment, the center wall 222 extends radially inward from the second rim 226 and the fourth rim 230 and therefore contacts the surface 211 of the component 204. In a split seal 214 embodiment, the seal 214 may be sized in the free state to be smaller than the operating diameter of the component 204 and therefore preload radially inboard within the seal cavity 200. The carrier 220 may be formed from a high-temperature metal alloy, a high temperature ceramic material, a high temperature ceramic composite, or a combination of two or more of these, to name just a few non-limiting examples.

The compliant rope seals 216, 218 largely fill potential leakage gaps created by stair-stepping typical of a ring of segmented sections comprising the components 202, 204. Equal and opposite forces applied by the forward and aft cavity 200 walls 208, 212 and the rope seals 216, 218 causes the carrier 220 to slide axially to the center of the seal cavity 200. Therefore, axial gaps 232 and 234 between the carrier 220 and the surfaces 208, 212 are of equal size and are maintained at all steady state and transient operating conditions. These small gaps 232, 234 are only approximately half the size of the cavity 200 design clearance gap 206 in some embodiments and therefore reliably contain the rope seals 216, 218. The stiff cross-sectional shape of the carrier 220 enables preload to be achieved (i.e., when the seal 214 is sized in the free state to be smaller than the operating diameter of the component 204) as well as helps the seal 214 to resist rolling within the cavity 200. A full-hoop (i.e., non-split) seal 214 would eliminate leakage associated with a split but would require a taller seal cavity and not provide the additional sealing contact at the surface 211 of the component 204.

Figure 4:
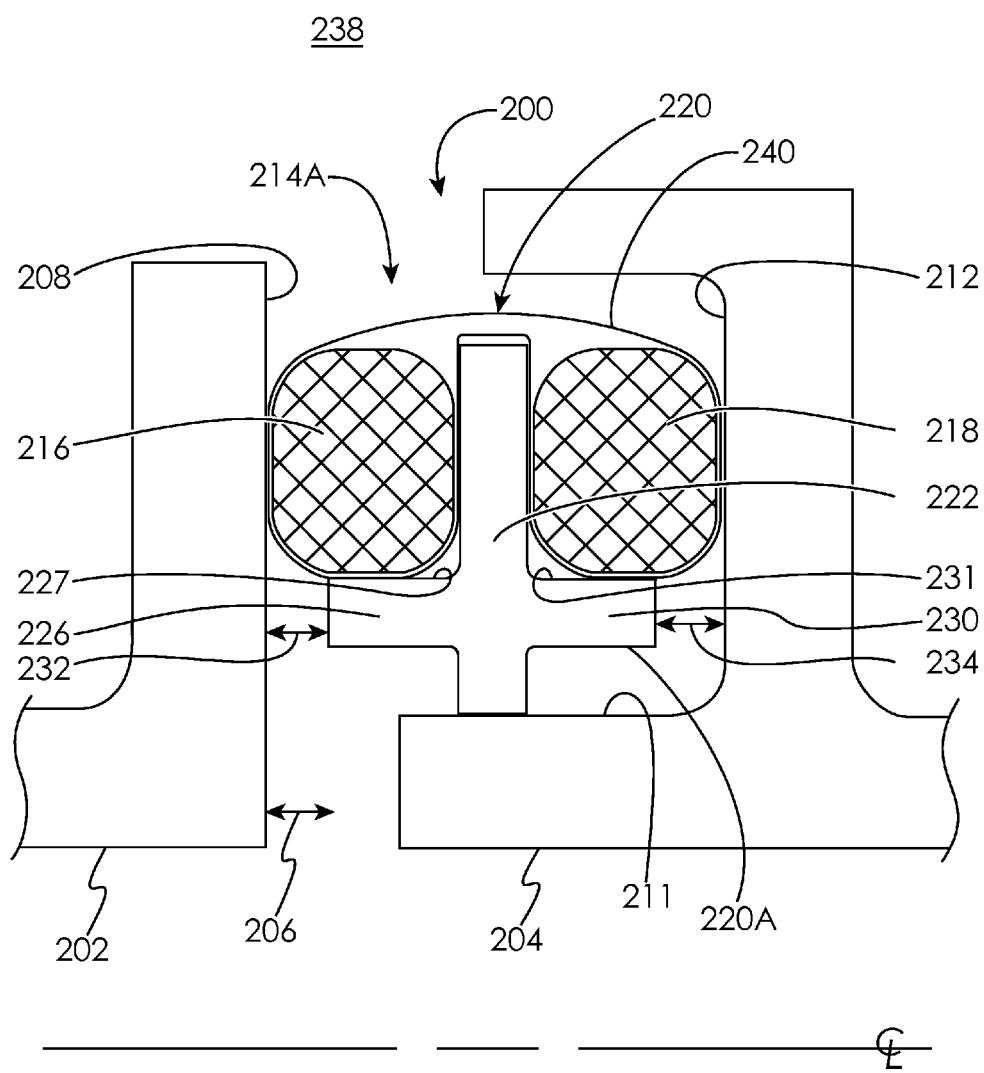
FIG. 4 is a schematic cross-sectional view of a seal and seal cavity in an embodiment.

In the embodiment of FIG. 4, the first rim 224 and the second rim 226 are omitted from the carrier 220A in a seal 214A, and the rope seals 216, 218 are retained by a sheath 240 that wraps around both rope seals 216, 218 and over the center wall 222 of the carrier 220A, eliminating any risk associated with potential liberation of the rope seals 216, 218. The sheath may be formed from any material appropriate to the anticipated operating conditions of the seal 214A. For example, the sheath 240 may be constructed from mesh formed from small diameter wire (e.g. 0.006 inch (0.0152 cm) diameter), or from a non-metallic material (for example, NEXTEL ceramic textile available from The 3M Company of Maplewood, Minn. USA), to name just a few non-limiting examples.

Figure 5:
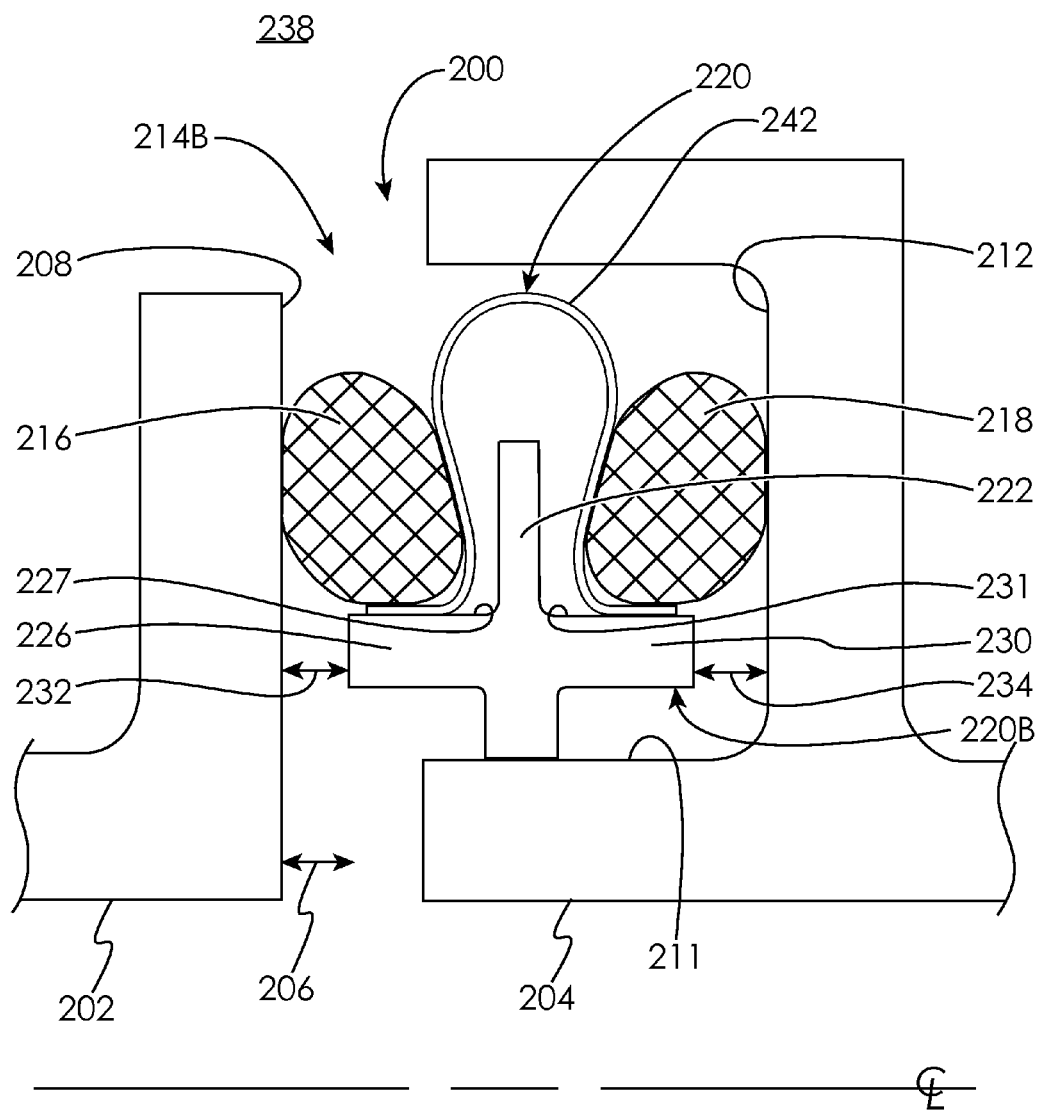
FIG. 5 is a schematic cross-sectional view of a seal and seal cavity in an embodiment.

In the embodiment of FIG. 5, a seal 214B includes an omega seal 242 disposed between the carrier 220B and the rope seals 216, 218 to increase resilience of the seal 214B for applications where the seal cavity 200 is more active (i.e., experiences more relative axial motion). The omega seal 242 enables the seal 214B to more significantly load axially against the sealing surfaces 208, 212. The spring rate of the omega seal 242 may be chosen to achieve a desired axial load for the seal 214B and assures that the seal 214B is pressure-energized at engine start. In an embodiment, a sheath (not shown) similar to the sheath 240 of FIG. 4 may encapsulate both rope seals 216, 218 and the omega seal 242.

Figure 6:
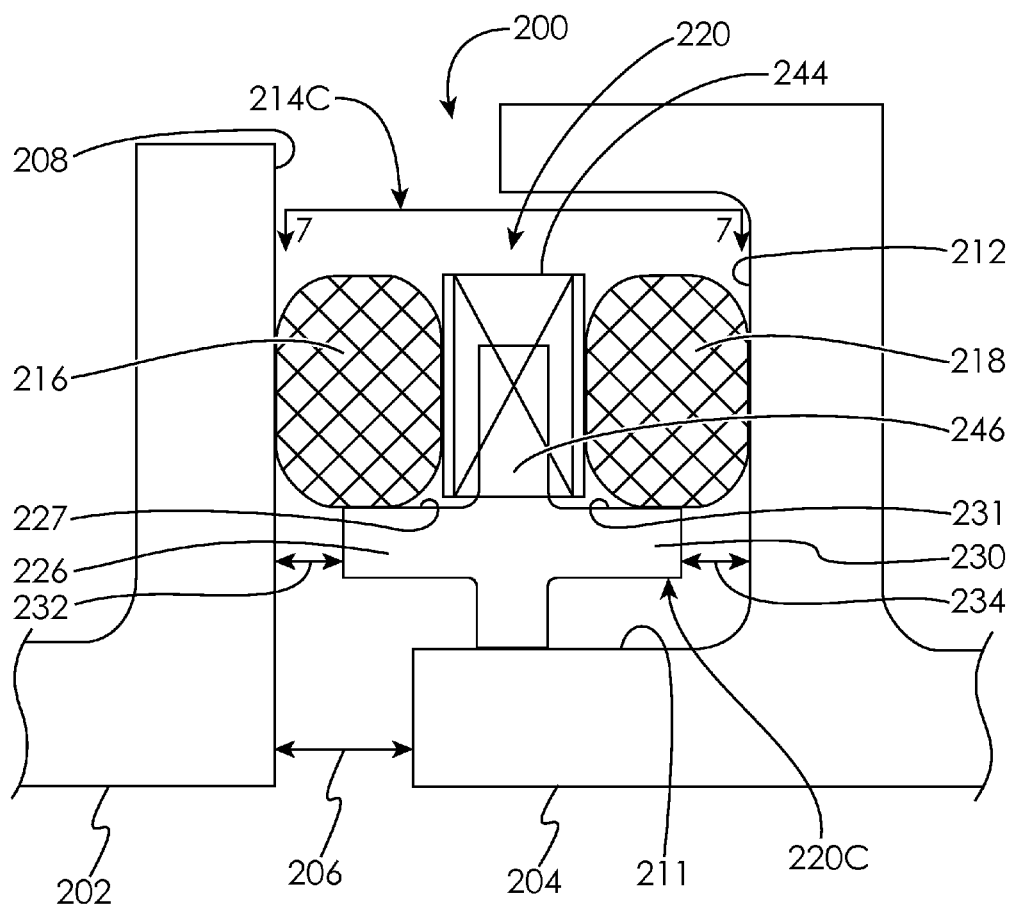
FIG. 6 is a schematic cross-sectional view of a seal and seal cavity in an embodiment.
Figure 7:
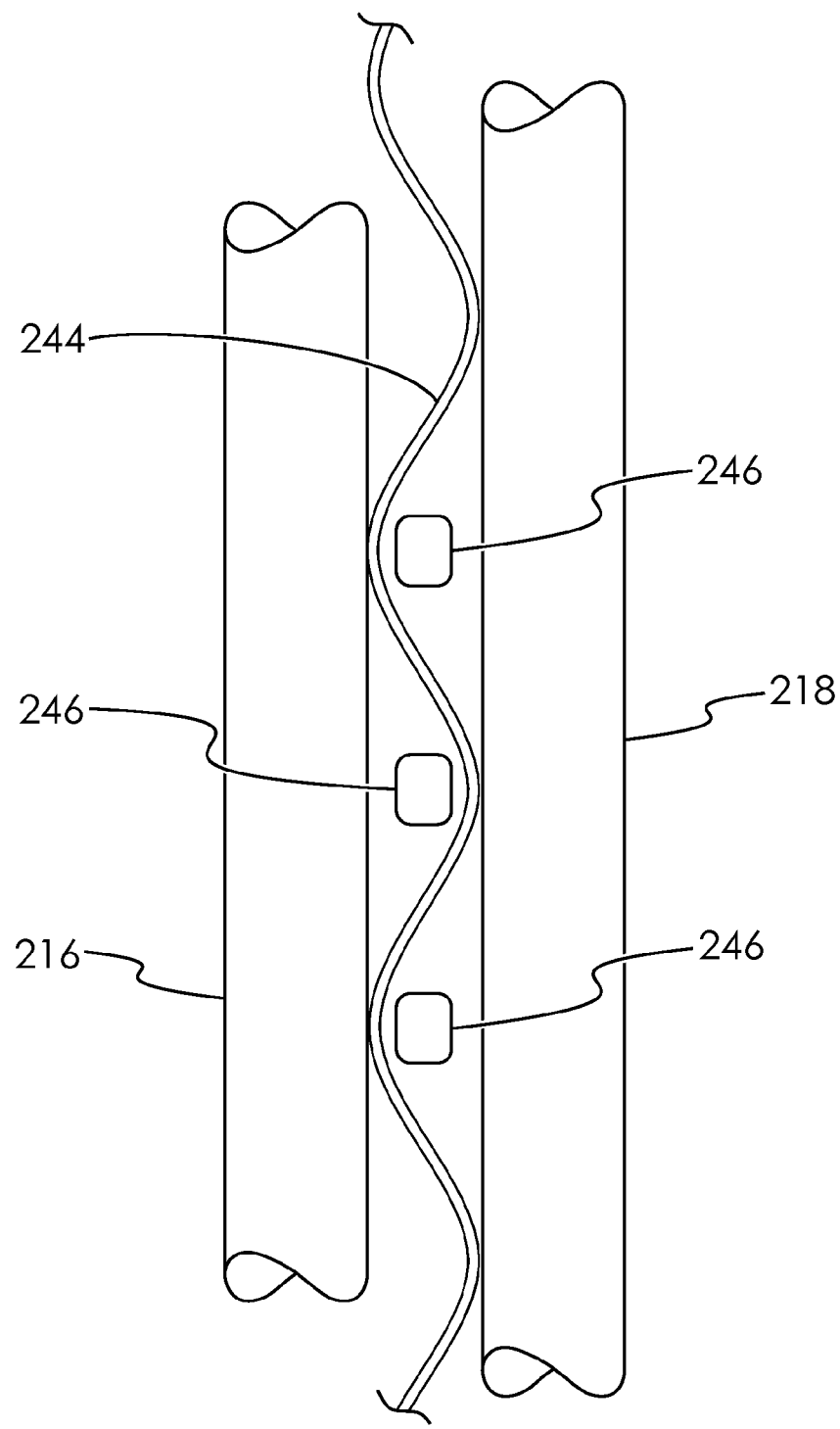
FIG. 7 is a schematic partial plan view of a seal in an embodiment.

In the embodiment of FIG. 6, a seal 214C includes a full hoop wave spring 244 disposed between the rope seals 216, 218. As with the embodiment of FIG. 5, the wave spring 244 increases resilience of the seal 214C for applications where the seal cavity 200 is more active (i.e., experiences more relative axial motion). As shown in FIG. 7, two or more optional radial posts or pins 246 may extend from the carrier 220C to keep the wave spring 244 roughly centered about the carrier 220C. The wave spring 244 enables the seal 214C to more significantly load axially against the sealing surfaces 208, 212. The spring rate of the wave spring 244 may be chosen to achieve a desired axial load for the seal 214C and assures that the seal 214C is pressure-energized at engine start. In an embodiment, a sheath (not shown) similar to the sheath 240 of FIG. 4 may encapsulate both rope seals 216, 218 and the wave spring 244.

Figure 8:
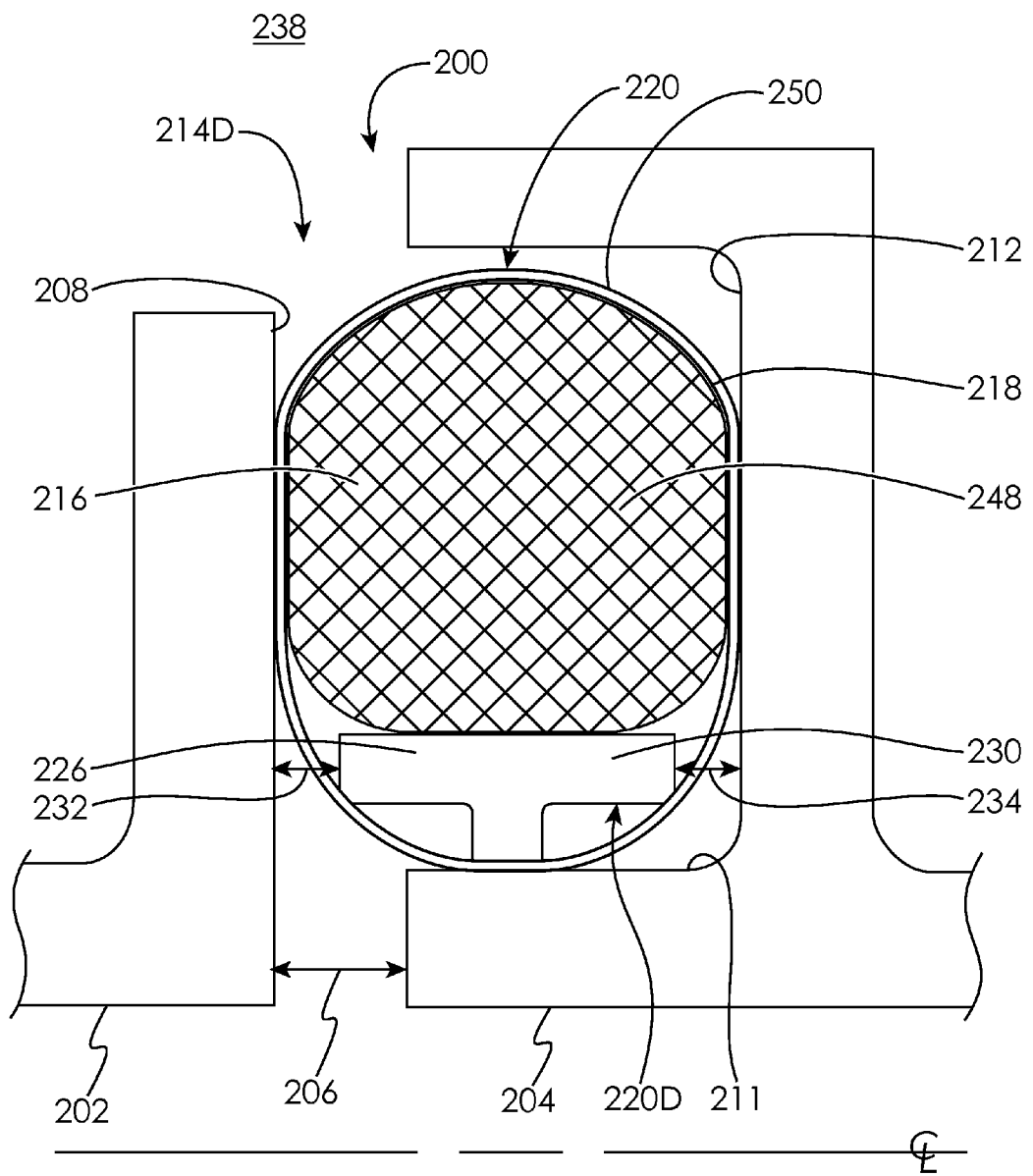
FIG. 8 is a schematic cross-sectional view of a seal and seal cavity in an embodiment.

In the embodiment of FIG. 8, a seal 214D includes a single rope seal 248 that fills the axial dimension of the cavity 200. The center wall 222 is omitted from the carrier 220D such that the rope seal 248 is supported by the second rim 226 and the fourth rim 230. Both the rope seal 248 and the carrier 220D are encapsulated by a sheath 250. The sheath 250 may be formed from any material appropriate to the anticipated operating conditions of the seal 214D. For example, the sheath 250 may be constructed from mesh formed from small diameter wire (e.g. 0.006 inch (0.0152 cm) diameter), or from a non-metallic material (for example, NEXTEL ceramic textile available from The 3M Company of Maplewood, Minn. USA), to name just a few non-limiting examples. Securing the rope seal 250 to the full or split-hoop carrier 220D, in combination with the small gap widths 232, 234, mitigates any risk of liberation of the seal 214D.

Unlike the seal 108, the seal 214 is not substantially deflected as the components 202 and 204 move relative to each other during engine assembly and engine operation. Additionally, the rope seals 216, 218 are able to better conform to axial stair-stepping associated with component tolerances and thermal/mechanical loading of the components 202 and 204. Therefore, sealing is maintained while the components 202 and 204 and the components of the seal 214 move relative to one another. Because the carrier 220 slides with respect to the components 202, 204, the seal 214 is not substantially deflected by the relative movement between the components 202 and 204 and the seal 214 may be formed from significantly thicker material than that used in the w-seal 108.

Additionally, the seal 214 can be made from a lower strength material, such as cobalt alloys to name just one non-limiting example, can be used since the carrier 220 slides rather than being deflected/compressed. Such lower strength material may be lower cost, have higher temperature capability, be more manufacturable, and/or more wear-resistant because thicker material may be used and/or lower strength lubricious material may be used. Also, the rope seal 216, 218 material has very high temperature capability. Sheathing, where included, may be made from a low-strength, high-temperature material. Where resilient members are used (i.e., the omega seal 242 and the wave spring 244), they are shielded from gas path high temperature air and radiation, as well as thermal conduction from the surfaces 208, 212. The seal 214 also exhibits potentially improved wear tolerance due to compliant contact (rather than hard contact) against stair-step high points of the components 202, 204, and the ability to use lubricious materials (e.g., cobalt-base alloys) for the carrier 220 and the sheath 240, 250. The seal 214 is potentially more resilient when using the omega seal 242 and the wave spring 244, because the sheet metal springs can be made from lower-temp, higher-strength material. Additionally, the wave spring 244 can be configured to be exceptionally resilient by varying the sheet thickness and wave length. Additionally, the seal 214 is less susceptible to distortion or breakage, which can cause leakage of gas past the seal 214 and/or liberation of the seal. Furthermore, the seal 214 exhibits improved vibration tolerance due to friction damping.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined by first and second adjacent components disposed about a centerline, the seal comprising:
    a first compliant seal;
    a second compliant seal; and
    a carrier comprising:
        a circumferential center wall;
        a first rim extending from the center wall in a first axial direction, the first rim at least partially supporting the first compliant seal; and
        a second rim extending from the center wall in a second axial direction, the second rim at least partially supporting the second compliant seal;
    wherein the first and second compliant seals are configured to sealingly engage with the first and second components; and
    a sheath wrapped around the first complaint seal, the second complaint seal and the circumferential center wall.

2. The seal of claim 1, wherein the first compliant seal comprises a first rope seal and second compliant seal comprises a second rope seal.

3. The seal of claim 1, wherein a portion of the first compliant seal extends in the first axial direction further than the first rim and a portion of the second compliant seal extends in the second axial direction further than the second rim.

4. The seal of claim 1, wherein the sheath is formed from a material selected from the group consisting of a wire mesh, a non-metallic material, and a ceramic textile.

5. The seal of claim 1, further comprising an omega seal disposed between the first compliant seal and the second compliant seal and operative to bias the first compliant seal against the first component and the second compliant seal against the second component.

6. The seal of claim 5, further wherein the sheath substantially encapsulates the first compliant seal, the second compliant seal, and the omega seal.

7. The seal of claim 1, further comprising a wave spring disposed between the first compliant seal and the second compliant seal and operative to bias the first compliant seal against the first component and the second compliant seal against the second component.

8. The seal of claim 7, wherein the sheath substantially encapsulates the first compliant seal, the second compliant seal, and the wave spring.

9. A seal for sealing a space defined by first and second adjacent components disposed about a centerline, the seal comprising:
    a first compliant seal;
    a second compliant seal; and
    a carrier comprising:
        a circumferential center wall;
        a first rim extending from the center wall in a first axial direction, the first rim at least partially supporting the first compliant seal; and a second rim extending from the center wall in a second axial direction, the second rim at least partially supporting the second compliant seal;

wherein the first and second compliant seals are configured to sealingly engage with the first and second components;

a wave spring disposed between the first compliant seal and the second compliant seal and operative to bias the first compliant seal against the first component and the second compliant seal against the second component; and two or more radial posts extending radially from the carrier, wherein a first portion of the wave spring is disposed in the first axial direction from at least one of the radial posts, and a second portion of the wave spring is disposed in the second axial direction from at least another one of the radial posts.

10. The seal of claim 2, wherein the first and second rope seals comprise braided ceramic rope seals.

11. The seal of claim 1, wherein the carrier is selected from the group consisting of: continuous hoop and split.

12. The seal of claim 1, wherein the center wall extends radially inward from the first rim and the second rim and contacts the second component.

13. The seal of claim 11, wherein the carrier has a carrier diameter in a free state that is less than a radially inner cavity diameter of the seal cavity, wherein the carrier preloads radially inward when disposed within the seal cavity.

14. The seal of claim 1, wherein the carrier further comprises:

a third rim extending from the center wall in the first axial direction, wherein the first rim and the third rim define a first circumferential cavity therebetween;

a fourth rim extending from the center wall in the second axial direction, wherein the second rim and the fourth rim define a second circumferential cavity therebetween;

wherein the first compliant seal is at least partially disposed within the first circumferential cavity and the second compliant seal is at least partially disposed within the second circumferential cavity.

15. The seal of claim 1, wherein the carrier is formed from a material selected from one of a high-temperature metal alloy, a high-temperature ceramic material, and a high-temperature ceramic composite, or a combination of two or more of a high-temperature metal alloy, a high-temperature ceramic fiber material and a high-temperature ceramic fiber composite.

16. A seal for sealing a space defined by first and second adjacent components disposed about a centerline, the seal comprising:

a compliant seal; and a carrier comprising:

a circumferential center wall;

a first rim extending from the center wall in a first axial direction, the first rim at least partially supporting the first compliant seal; and a second rim extending from the center wall in a second axial direction, the second rim at least partially supporting the second compliant seal;

wherein the first rim and the second rim at least partially support the compliant seal;

wherein the compliant seal is configured to sealingly engage with the first and second components; and a sheath substantially encapsulating the compliant seal and the carrier.

17. The seal of claim 16, wherein the compliant seal comprises a rope seal.

18. The seal of claim 16, wherein the sheath is formed from a material selected from the group consisting of a wire mesh, a non-metallic material, and a ceramic textile.

* * * * *